US008856168B2

United States Patent
Sayers et al.

(10) Patent No.: US 8,856,168 B2
(45) Date of Patent: Oct. 7, 2014

(54) CONTEXTUAL APPLICATION RECOMMENDATIONS

(75) Inventors: Craig Peter Sayers, Menlo Park, CA (US); Shyam Sundar Rajaram, San Francisco, CA (US); Mathieu Thouvenin, San Francisco, CA (US); Shama Pagarkar, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 158 days.

(21) Appl. No.: 13/459,307

(22) Filed: Apr. 30, 2012

(65) Prior Publication Data

US 2013/0290369 A1    Oct. 31, 2013

(51) Int. Cl.
*G06F 7/00* (2006.01)
*G06F 17/30* (2006.01)

(52) U.S. Cl.
USPC ........................................................ 707/769

(58) Field of Classification Search
USPC ....................... 705/26.62, 26.7; 707/723, 769
See application file for complete search history.

(56) References Cited

U.S. PATENT DOCUMENTS

| | | | | |
|---|---|---|---|---|
| 8,396,759 | B2 * | 3/2013 | Mehta et al. | 705/26.7 |
| 8,484,636 | B2 * | 7/2013 | Mehta et al. | 717/176 |
| 2004/0024720 | A1 * | 2/2004 | Fairweather | 706/46 |
| 2009/0083147 | A1 * | 3/2009 | Paila et al. | 705/14 |
| 2010/0217690 | A1 * | 8/2010 | Lee et al. | 705/27 |
| 2011/0066507 | A1 | 3/2011 | Iyer et al. | |
| 2011/0238608 | A1 | 9/2011 | Sathish | |
| 2011/0277027 | A1 * | 11/2011 | Hayton et al. | 726/8 |
| 2011/0307359 | A1 * | 12/2011 | Gude et al. | 705/31 |
| 2012/0021774 | A1 * | 1/2012 | Mehta et al. | 455/456.3 |
| 2012/0290441 | A1 * | 11/2012 | Mahaniok et al. | 705/26.62 |
| 2012/0303477 | A1 * | 11/2012 | Ben-Itzhak | 705/26.7 |
| 2012/0323898 | A1 * | 12/2012 | Kumar et al. | 707/723 |
| 2013/0051615 | A1 * | 2/2013 | Lim et al. | 382/103 |
| 2013/0073614 | A1 * | 3/2013 | Shine et al. | 709/203 |
| 2013/0304608 | A1 * | 11/2013 | Mehta et al. | 705/26.7 |

OTHER PUBLICATIONS

Feng-Hsu Wang, "A Contextualization Method of Browsing Events in Web-based Learning Content Management System for Personalized Learning," IEEE (2007).
Jie Yu, and Fangfang Liu, "A Short-term User Interest Model for Personalized Recommendation," IEEE (2010).
Qiang Xu, et al., "Identifying Diverse Usage Behaviors of Smartphone Apps," IMC (2011).

* cited by examiner

*Primary Examiner* — Robert Beausoliel, Jr.
*Assistant Examiner* — Nicholas Allen

(57) ABSTRACT

The disclosure relates to methods and systems for generating application retention metrics. In one aspect, a method for generating a contextual application recommendation is disclosed. Contextual web location information including a remote developer identifier and/or a remote application identifier is received from a remote application. An application database including application records with a developer identifier and an application identifier is queried to determine if the contextual web location information corresponds to an application recommendation. The application database query includes comparing the remote developer identifier to the application database developer identifier to generate a first application recommendation, and/or comparing the remote application identifier to the application database application identifier to generate a second application recommendation. If a recommendation is found, the first and/or the second application recommendation is transmitted to a user of the remote application.

15 Claims, 7 Drawing Sheets

CONTEXTUAL APPLICATION RECOMMENDATIONS

BACKGROUND

In an application catalog environment, users may browse the application catalog to potentially identify and download/install new software applications of interest to the user. In a web browser environment, advertisement methods may be used to display advertisements related to the web content the user is currently viewing.

DESCRIPTION OF THE DRAWINGS

The following detailed description of the various disclosed methods, processes, systems, and apparatus refers to the accompanying drawings in which.

DETAILED DESCRIPTION

Figure 1A:
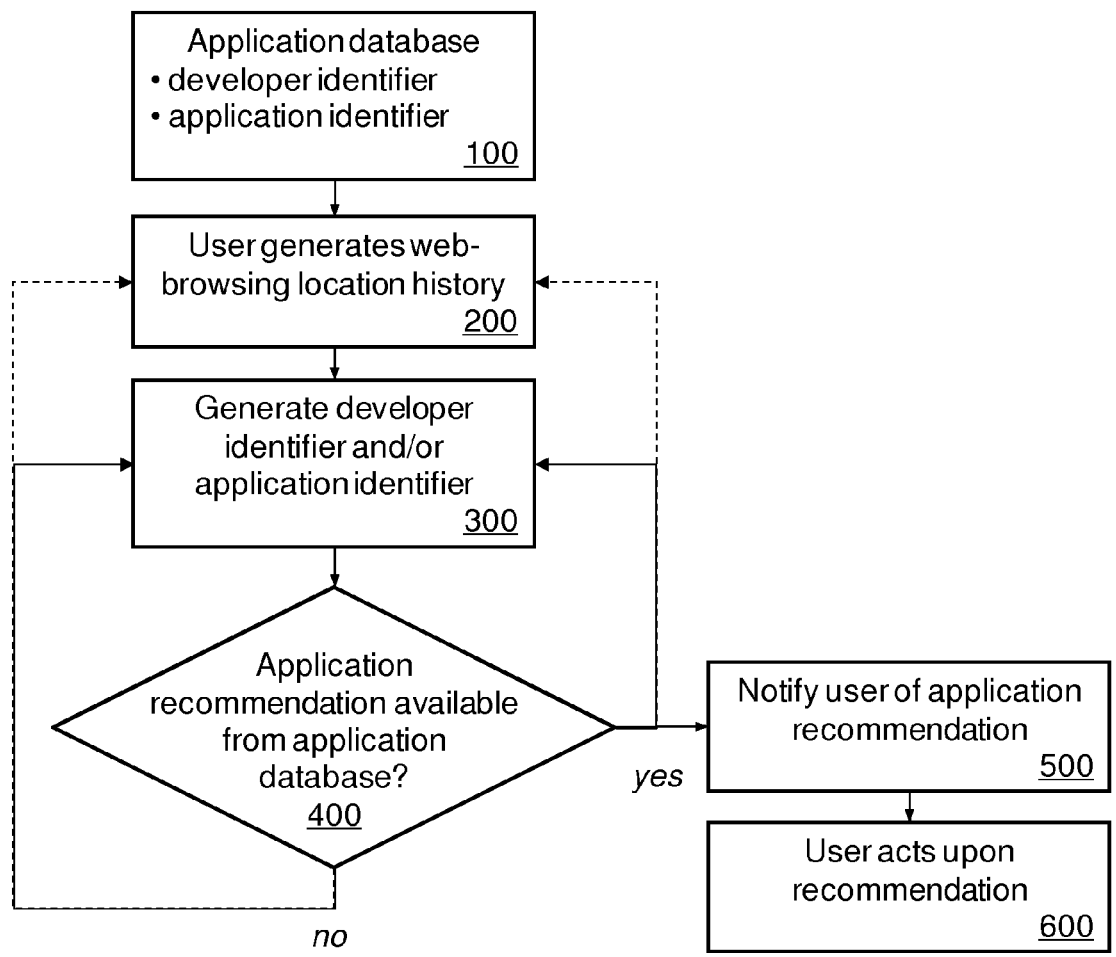
FIGS. 1A and 1B are flowcharts illustrating methods for generating contextual application recommendations according to the disclosure.

In an application catalog environment, users may browse the application catalog to potentially identify and download/install new software applications of interest to the user. In a web browser environment, advertisement methods may be used to display advertisements related to the web content the user is currently viewing.

Existing application catalog environments provide little assistance to users attempting to discover new applications of interest. Application catalog searching, indexing, identification of related applications, and download metrics can assist a user in locating an application of interest when the user already has knowledge regarding the specific application title or those of closely related applications having the desired functionality. However, the existing application catalog environments do not provide simple, effective tools to help users discover entirely new/unknown applications.

The disclosure relates to methods and systems for generating contextual application recommendations based on a user's web browsing behavior. A browser navigation event generates contextual developer and/or application information that is compared to an application recommendation database to determine if one or more applications are available from (i) a developer associated with the user's current web location and/or (ii) another developer related to the developer associated with the user's current web location. For example, the URL of the user's current web location can be compared with an index of developer URLs in the application database to identify an application to be recommended to the user (e.g., instantly via a banner notification; alternatively or additionally with a delay such as via a notification upon the user's next visit to the application catalog).

The application recommendation database and process can be managed remotely, for example by an application catalog content provider for a given hardware platform corresponding to that of the local browser application. Alternatively, the application recommendation database and process can be managed locally on a user's computing device, for example by periodically downloading/updating the application recommendation database from the application catalog content provider.

The methods and systems provide a convenient means to recommend potentially relevant applications of interest to a user without requiring the user to specifically search for the applications within the application catalog environment. The system can further alert a user to an application that the user does not know exists for its particular hardware platform (i.e., and, hence, an application for which the user would not search in the application catalog). Additionally, the methods do not require access to the actual content of visited web pages (although such information may be used when desired). This provides an advantage to developers, as they need not update their web pages when they release new applications and/or versions. The act of providing the new application/version through the application content provider also specifies the relevant developer identifier (e.g., as an internet location for the developer), thus providing sufficient information for the content provider to generate relevant recommendations. No reliance on actual web resource content enables a rapid recommendation engine based only the browser location history that can be performed concurrently with a browsing session or subsequent to a prior browsing session.

Figure 1B:
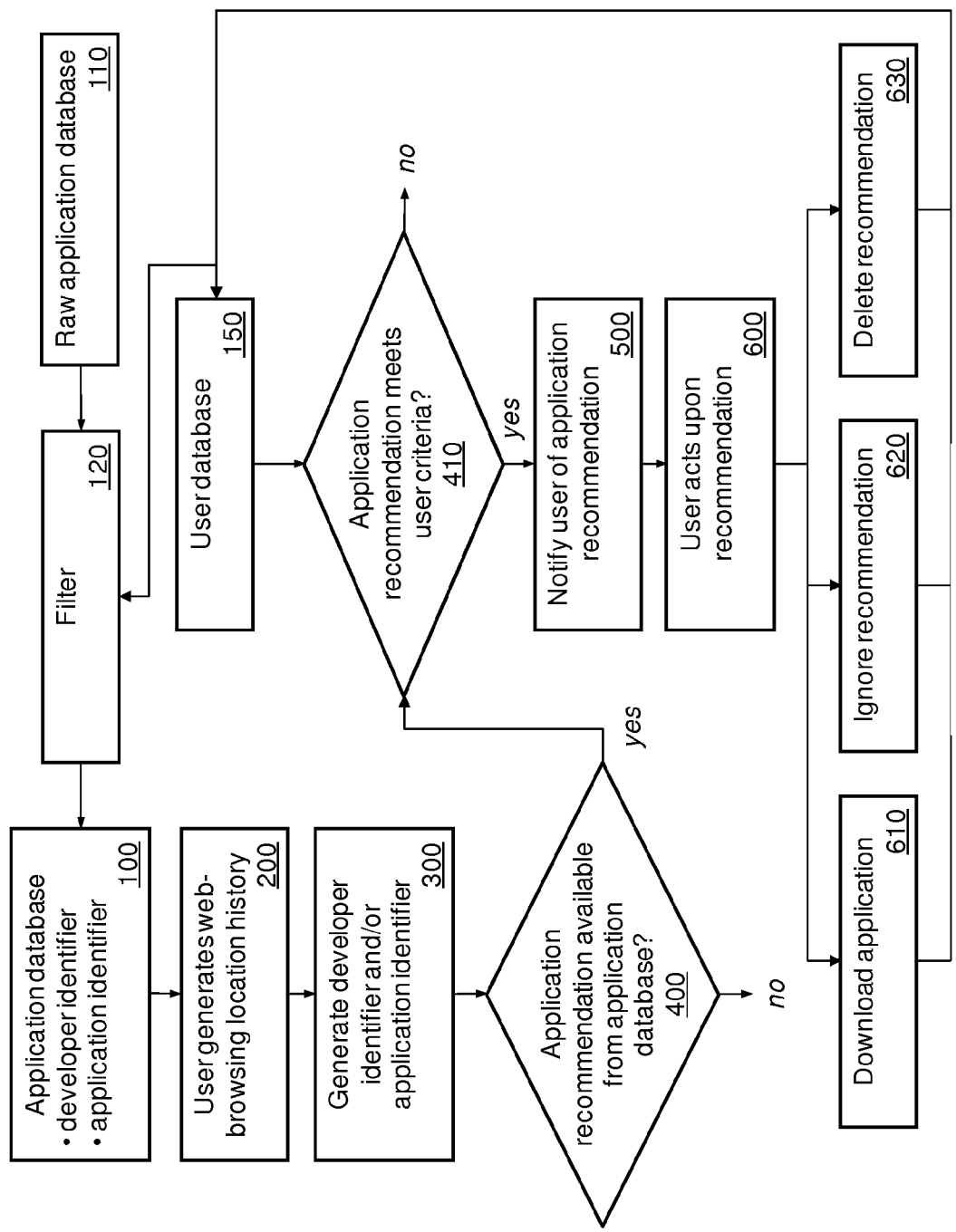

FIGS. 1A and 1B are flowcharts and provide overviews of methods for generating contextual software applications recommendations according to the disclosure. An application database 100 includes a plurality of application records. For example, the application database 100 may be a centralized database managed by a (remote) application content provider such as a web- or internet-based application catalog that provides access to a variety of software applications for download or purchase by a (local) user (e.g., a user having a computing device with an applicable operating system and/or hardware for the available applications). Each application record in the database includes an application identifier and a developer identifier. The application identifier may be any suitable identifier that uniquely identifies an available application (e.g., application name, release number, version number, and/or some unique index corresponding to a combination of the foregoing application properties).

The developer identifier may be any suitable identifier that uniquely identifies the developer/publisher of the associated application in the application database 100. For example, the developer identifier may include the developer name, developer internet address/location, developer physical address/location, other developer contact information such as email address(es) and/or telephone number(s), and/or some unique index corresponding to a combination of the foregoing developer properties. In one aspect, the developer identifier includes a uniform resource locator (URL) address associated with the developer (e.g., an internet address or portion thereof associated with the developer). In a refinement, the URL address associated with the developer may be canonicalized or simplified relative to a full address to facilitate subsequent indexing/searching. For example, the developer URL address used as the developer identifier may include the top-level domain and the second-level domain for the internet web page(s) associated with a developer's application (e.g., alone or in addition to other URL address segments). As an illustration, a developer URL address of "http://www.developer- .com" or "http://www.developer.com/application1" associated with the developer's software title "Application #1" may be canonicalized to "developer.com" for use as the developer identifier stored in the application database 100 (i.e., where "developer" is the second-level domain and "com" is the top-level domain). As illustrated in Example 1 below, the canonical form of the developer identifier stored in the application database 100 may be refined to include additional URL information such as "developer.com/application1" to distinguish other applications available from the same developer on the basis of the developer identifier field (e.g., distinguished from "developer.com/application2" in another record associated with "Application #2" from the same developer). The developer identifier (in canonical form or otherwise) may be used to build an index with the application identifier from or as the application database 100, for example by using an associative array.

In one aspect, the application database 100 may contain all or a subset of software applications available from the application content provider. For example, the subset of applications may be selected by the application content provider based on any desired subjective and/or objective criteria (e.g., applications meeting a minimum rating, download, usage, etc. threshold such as based on usage and/or preferences across many users). In this way, the application database 100 may be pre-filtered to contain only applications meeting a desired quality standard and being worthy of recommendation according to the disclosed method. For instance, as illustrated in FIG. 1B, a raw application database 110 may be managed remotely by the application content provider and may have records related to all applications available from the content provider (e.g., records in a format/data structure the same as or similar to that of the application database 100). The raw application database 110 is filtered (120) by the content provider according to the desired subjective and/or objective criteria to yield the filtered application database 100 (e.g., stored remotely or locally on a user's computing device) for providing recommendations.

To obtain a contextual application recommendation, a user generates (200) a contextual web location, for example as part of a web location browsing history (e.g., including at least one contextual web location). The contextual web location may be (locally) generated using a web browser software application installed on a suitably programmed computing device (e.g., the user's local computing device). The user of the web browser navigates to a web location, and the particular location visited is stored in a computer readable form (e.g., a (chronological) list of URLs visited stored in and accessible from computer memory and/or a storage medium).

Contextual web location information including a local developer identifier and/or a local application identifier is then generated (300) from the user's contextual web location/browsing history. In cases where the developer identifier in the application database 100 includes a URL address (e.g., full, canonical, or otherwise partial address), the local developer identifier suitably also includes a URL address. In particular, the local developer identifier may be a local URL address or portion thereof obtained by accessing or reading the user's contextual web location/browsing history. In some cases, a single local URL address from the browsing history (e.g., oldest entry, most recent entry) may be used as the local developer identifier. In other cases, multiple local URL addresses from the browsing history may be used to provide multiple corresponding local developer identifiers. As above, the local URL address similarly may be in its native or canonical form (e.g., determined at the local user's device or determined remotely by the application content provider based on a native address received from the local user's device). Expression of both the local and (remote) reference URLs in canonical form may expedite the subsequent process of searching the application database 100 and generating the contextual application recommendation (described below). In an aspect, the contextual web location information contains only the local developer identifier, for example in the form of the local URL address as the exclusive form of information used to obtain the contextual application recommendation (e.g., no local application identifier or other information/content from the visited web locations is needed or used). In another aspect, the developer identifier may be a hash or other privacy-protecting transform of the URL address, allowing identifiers to be shared with the remote application content provider and allowing the provider to query and compare those identifiers without exposing the user's browsing location history.

The contextual web location information may include the local application identifier as an alternative to or in additional to the local developer identifier. The local application identifier may be obtained from the information or content of web locations present in the browsing history (e.g., including content from one or multiple URL addresses in the browsing history as above). For example, the local application identifier for a particular contextual web location may be read from the web page visited, such as in the form of a metatag in the web document or otherwise.

The software program generating the contextual web location information, generating/obtaining the contextual application recommendation, notifying the user of the recommendation, etc. is suitably a stand-alone recommendation application being executed on the user's computing device. The recommendation application may run concurrently with the web browser generating the contextual web location information and/or an application content catalog program that permits the download/installation of the recommended applications. In other examples, the software instructions generating the application recommendation may be incorporated as a component of a larger application, such as the web browser or the application content catalog program.

The application database 100 is then queried (400) to determine whether the contextual web location information corresponds to an application recommendation. Generally, the local developer identifier in the contextual web location information (when present) is compared with the developer identifier field of the application database 100. A local developer identifier found in the application database 100 generates a first application recommendation corresponding to the application identifier(s) in the application database 100 associated with the matched developer identifier. The first application recommendation may include more than one application to be recommended, for example where a developer website visited in a browsing session corresponds to a developer having multiple available applications (e.g., multiple entries in the application database may have the same developer identifier but different application identifiers corresponding to the different applications offered by the developer).

The query process based on the local developer identifier can be iterative in nature to refine the first application recommendation. For example, a first query may be based on the local developer identifier in simplest canonical form (e.g., second- and top-level domain information only from a given URL in the web location history). Second and subsequent queries may be performed by incrementally adding path components from the full URL in the web location history to the canonical URL used as the local developer identifier. In this way, initial queries that yield many or no results for the first application recommendation may be refined to generate a more relevant recommendation result based on the user's browsing history, as illustrated in Example 1 below.

Analogously to the local developer identifier, the local application identifier in the contextual web location information (when present) is compared with the application identifier field of the application database 100. A local application identifier found in the application database 100 generates a second application recommendation corresponding to the local application identifier. The second application recommendation generally includes only one application to be recommended (e.g., where the particular combination of developer identifier and application identifier in the application database 100 is unique for each record). In other examples, the second application recommendation may include multiple applications to be recommended (e.g., where multiple entries for the same developer identifier/application identifier combination exist in the application database 100, which may represent different versions, etc. of the same general application offered by the developer). In this way, the second application recommendation may be used to generate an application recommendation that is potentially more relevant to the user's particular browsing history (e.g., generating recommendations based on actual web pages visited as compared to developer domain identifiers potentially associated with multiple (non-related) applications).

In an example, the query 400 and corresponding application recommendation determination are performed remotely from the local user by an application database manager (e.g., the application content provider). In this case, the locally generated contextual web location information is transmitted from the user's computing device to the remote application database manager that maintains/updates the application database 100 (e.g., via the internet or other suitable data network as described below). The remote application database manager performs the query 400 to identify any applicable software recommendations. If any are found, the first and/or second application recommendations are transmitted by the application database manager and received by the local user.

In another example, the application database 100 may be locally stored on the user's computing device, such as in a local data file that is periodically updated from a remote (e.g., internet) application database manager to allow look-up of possible recommendations without contemporaneous remote data transmission. In this case, the query 400 and corresponding application recommendation determination are performed locally on the same computing device used by the local user to generate the contextual web location information.

If an application recommendation is identified by the query 400 (e.g., as either or both of the first and/or second application recommendations, the user is then notified (500) of the applicable recommendation(s). The application recommendation may be transmitted to the user's local computing device (e.g., displayed thereon). Suitably, the notification 500 is provided to the user in an environment external to the browser application on the local computing device. For example, the recommendation may be provided in the form of a banner or message displayed on the computing device (e.g., the recommendation is not provided in a browser pop-up window or otherwise associated with the browser application). Such notification 500 is suitable for both real-time and/or delayed notification relative to the browsing event generating the recommendation. Alternatively, the notification 500 may be in another application environment such as the application content catalog. For example, recommendations may be generated and/or displayed when the catalog program is opened, or recommendations previously generated during a browsing session may be displayed within the catalog. The recommendations in the application content catalog may be automatically displayed or displayed on user demand (e.g., such as by menu item/command selection).

As noted above, the notifications 500 may be provided to the user in essentially real-time or after a delayed interval relative to the browsing event generating the recommendation. For example, the notification 500 can be provided to the user while the browser application is directed to the web location generating the contextual web location information (e.g., a real-time process in which the browser application address bar remains pointed to the web location forming the basis for to query 400 and recommendation, whether as a single browsing window or as one of many). Alternatively or additionally, the notification 500 can be provided to the user when the browser application is not directed to the web location generating the contextual web location information (e.g., a delayed recommendation such as when the browser application is no longer running or pointed to the web location forming the basis for look-up/application recommendation). Such a delayed process may be used when a recommendation or a plurality of recommendations is presented to the user at a later time based on cumulative prior browsing session(s), such as the next time the user runs the application content catalog.

In addition to the first and/or second application recommendations provided by the query 400, additional application recommendation(s) related to at least one of the first application and the second application may be transmitted/notified to the user (e.g., by the application database manager). The relationship of the additional application relative the first and second applications is not particularly limited. Examples of suitable relationships determined by application database manager (e.g., application content provider) may be based on similar subject matter/functionality, user download/installation history/patterns, etc.

As indicated in FIG. 1A, regardless of whether an application recommendation is identified by the query 400, additional queries 400 based on new contextual web locations may be performed as illustrated by the feedback arrows. As shown by the dotted feedback arrows, real-time application recommendations may be generated each time the user navigates to a new web location and generates a new event in the browser history log. As shown by the solid feedback arrows, the recommendation application may generate a plurality of application recommendations, for example by cycling through a plurality of web locations such as might be present in a past or current browser history log (e.g., for batch processing of a plurality of recommendations such as when the application content catalog program is started).

As a result of the notification 500, the user may subsequently take action 600 based on the recommended application(s). For instance, the user may download and/or install (610) any or all of the recommended applications to his/her computing device (e.g., personal computer, laptop computer, mobile computing device such as smartphone, tablet computer, music player, etc.). For example, the user may accept the notification 500 and be redirected to a download/installation interface for the recommended application (e.g., within the application content catalog, which may contain additional descriptive information regarding the application). Similarly, the user may accept the notification 500 by saving or bookmarking the recommended application (e.g., within the application content catalog) so that the user may revisit the recommendation at a later time. The recommended application may be transmitted to the user in a computer-readable form by the application content provider, such as by delivery as an electronic download over the internet or other network. The delivered application may then be installed on a local computing device (e.g., the same computing device as that containing the local browser application and/or the local recommendation application). In other cases, the user may simply ignore (620) or affirmatively reject/delete (630) any or all of the recommended applications.

As illustrated in FIG. 1B, the application recommendation(s) identified by the query 400 may be filtered or otherwise restricted from being presented to the user to limit intrusions on the user and/or to limit provided recommendations to applications more likely to generate a positive response from the user. A user database 150 may contain information based on user-selected preferences and/or previous user actions related to the recommendations. Recommendations resulting from the application database 100 query 400 are subject to a second filter/query 410 based on user-specific criteria such as in the user database 150. The user database 150 may be stored locally on the user's device and/or managed remotely by the application content provider, in which case the user database 150 additionally may contain a unique user identifier to associate the user preferences/history with a particular local user.

As examples of user-selectable preferences, a user may select a maximum number of recommendations to be provided over a given period (e.g., maximum 5 recommendations per day, regardless of volume of web browsing activity during the period), and/or a user may select a minimum threshold to be exceeded before an application is recommended to the user (e.g., a given application must be identified in the query 400 at least 10 times based on distinct web browsing events before the user is notified (500) of the application recommendation). Similar preference filters may be incorporated into the logic for the query 400 (e.g., as default preferences set by the application content provider, but which may be customized by the user). As an example of a recommendation filter based on past user activity, a recommendation may be suppressed if the user has previously rejected or ignored the particular recommendation, such as for a preselected length of time (e.g., rejected recommendations are not re-presented to the user within a month from rejection, while ignored recommendations are not re-presented to the user within a week from being ignored).

As illustrated in FIG. 1B, the various user actions 600 (e.g., actions 610, 620, and/or 630) taken on the recommendation can be stored remotely or locally in the user database 150 for future user-specific recommendation limitations. Likewise, user actions 600 that are stored remotely by the application database 100 manager may be used to identify top-level filter 120 criteria applied by the application content provider. For instance, application recommendations that are routinely collectively ignored or deleted by users as a group may be filtered or eliminated from the application database 100 so that such applications are either not recommended in the future or only recommended on a relatively infrequent basis. Similarly, application recommendations that are frequently collectively accepted by users as a group may be identified for inclusion in the application database 100 from the raw database 110 and/or for relatively more frequent recommendation.

Figure 2A:
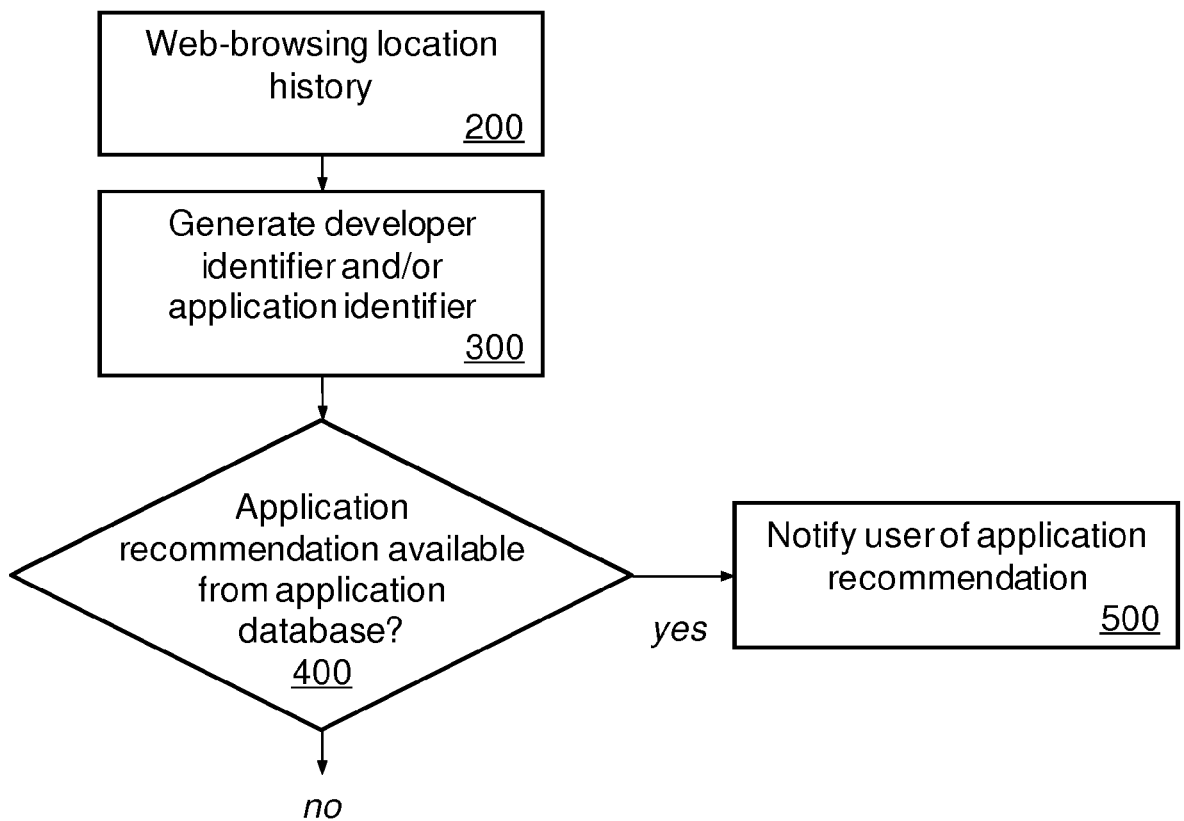
FIGS. 2A and 2B are flowcharts illustrating methods for generating contextual application recommendations by local web users.
Figure 2B:
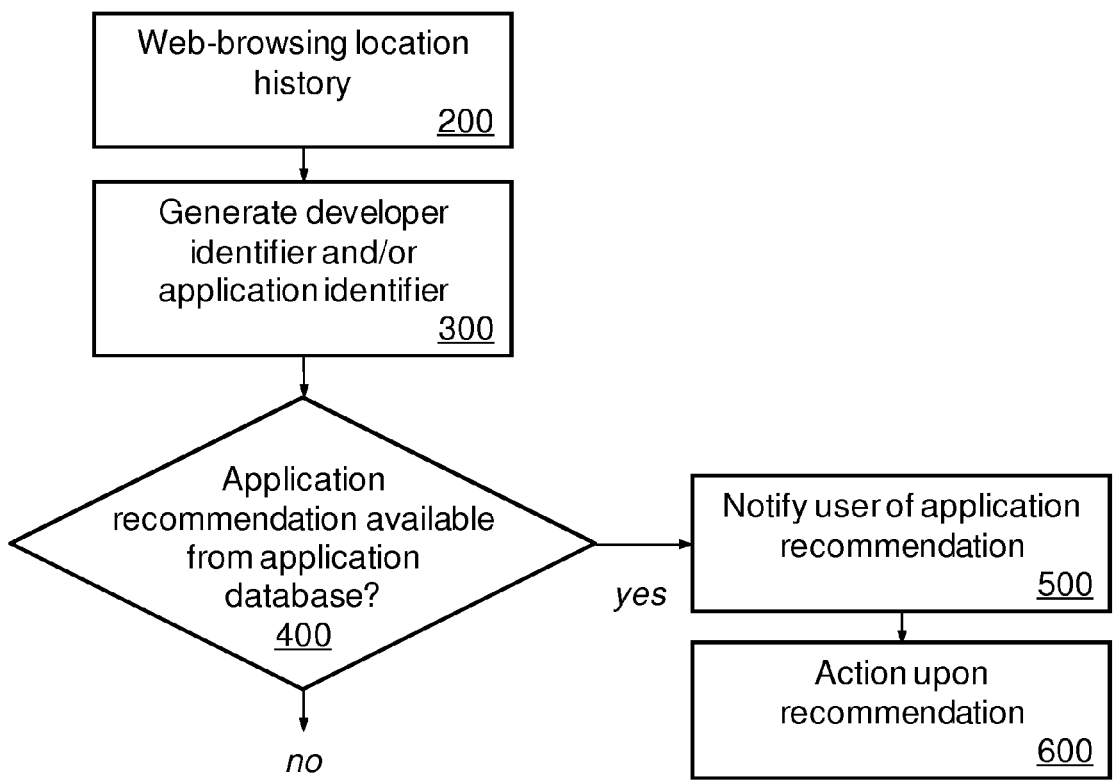

FIGS. 2A and 2B are flowcharts illustrating methods for generating contextual application recommendations by local web users. As described above in the context of the general methods of FIGS. 1A and 1B, a web browsing location history 200 (e.g., created by a local user of a computing device with a browser application) provides input data for generating the recommendation. Contextual web location information including a local developer identifier and/or a local application identifier is then generated (300) from the location history (e.g., using a recommendation application running on the computing device). An application database is queried (400) to determine if the contextual web location information corresponds to an application recommendation (e.g., a first application recommendation corresponding to the local developer identifier and/or a second application recommendation corresponding to the local application identifier). As illustrated in FIG. 1B, the available recommendations may be filtered based on criteria specific to the application content provider and/or the particular user. If an application recommendation is identified, the user of the browser application is notified (500) of the first application recommendation and/or the second application recommendation. In a refinement illustrated in FIG. 2B, an action (600) may be taken on any or all of the recommended application(s) (e.g., download or install to the local computing device, ignore, or delete the recommendations as above, such as in response to a user input). Similar to the manner illustrated with the feedback arrows in FIG. 1A, an iterative and/or continuous process may be used to generate multiple recommendations based on multiple different contextual web locations/events.

Figure 3A:
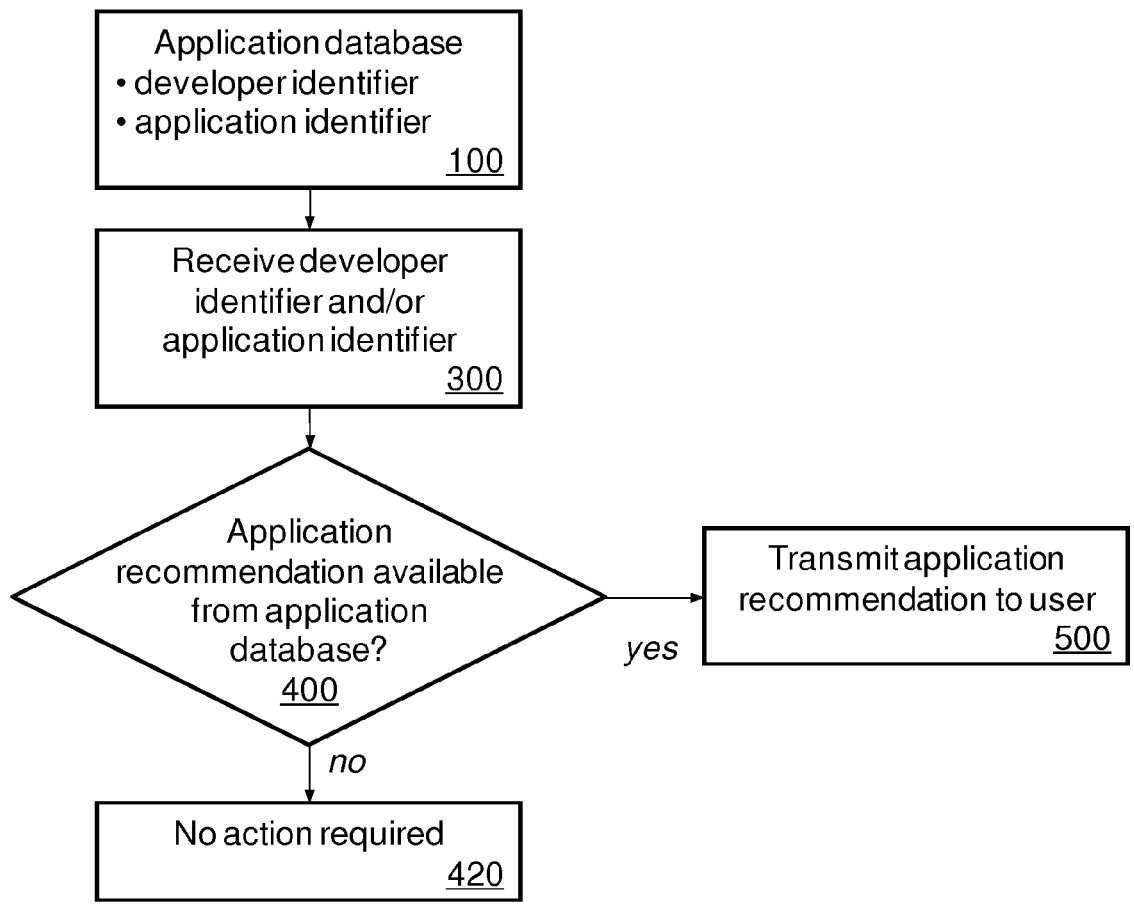
FIGS. 3A and 3B are flowcharts illustrating methods for generating contextual application recommendations by remote application database managers.
Figure 3B:
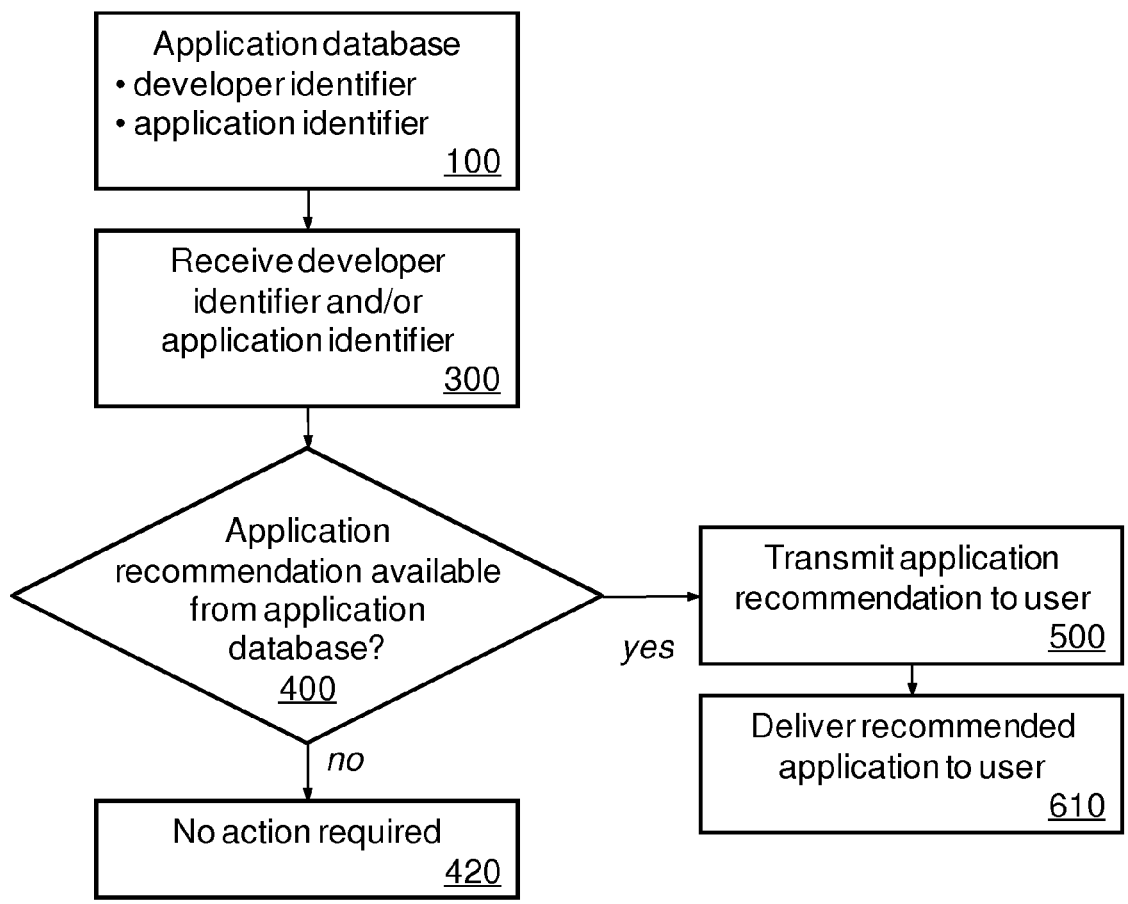

FIGS. 3A and 3B are flowcharts illustrating methods for generating contextual application recommendations by remote application database managers. As described above in the context of the general methods of FIGS. 1A and 1B, an application recommendation manager (e.g., application catalog content manager) has access to an application database 100 (e.g., as the database manager/host or otherwise) including a plurality of application records, where each record includes a developer identifier and a corresponding application identifier. The application recommendation manager receives (300) contextual web location information including a remote developer identifier and/or a remote application identifier from a remote application (e.g., derived from the browsing history of a user of a remote browser application, such as by an independent remote recommendation application). The application database 100 is queried (400) to determine if the contextual web location information corresponds to an application recommendation (e.g., a first application recommendation corresponding to the remote developer identifier and/or a second application recommendation corresponding to the remote application identifier). If an application recommendation is identified, the first application recommendation and/or the second application recommendation is transmitted (500) to a user of the remote application. As illustrated in FIG. 1B, the available recommendations may be filtered based on criteria specific to the application content provider and/or the particular user (e.g., when user preferences such as in the user database 150 are stored by or otherwise accessible to the application content provider). In a refinement illustrated in FIG. 3B, any or all of the recommended application(s) may be transmitted/delivered (610) to the user (e.g., to the user's remote computing device running the remote application such as for installation).

Figure 4:
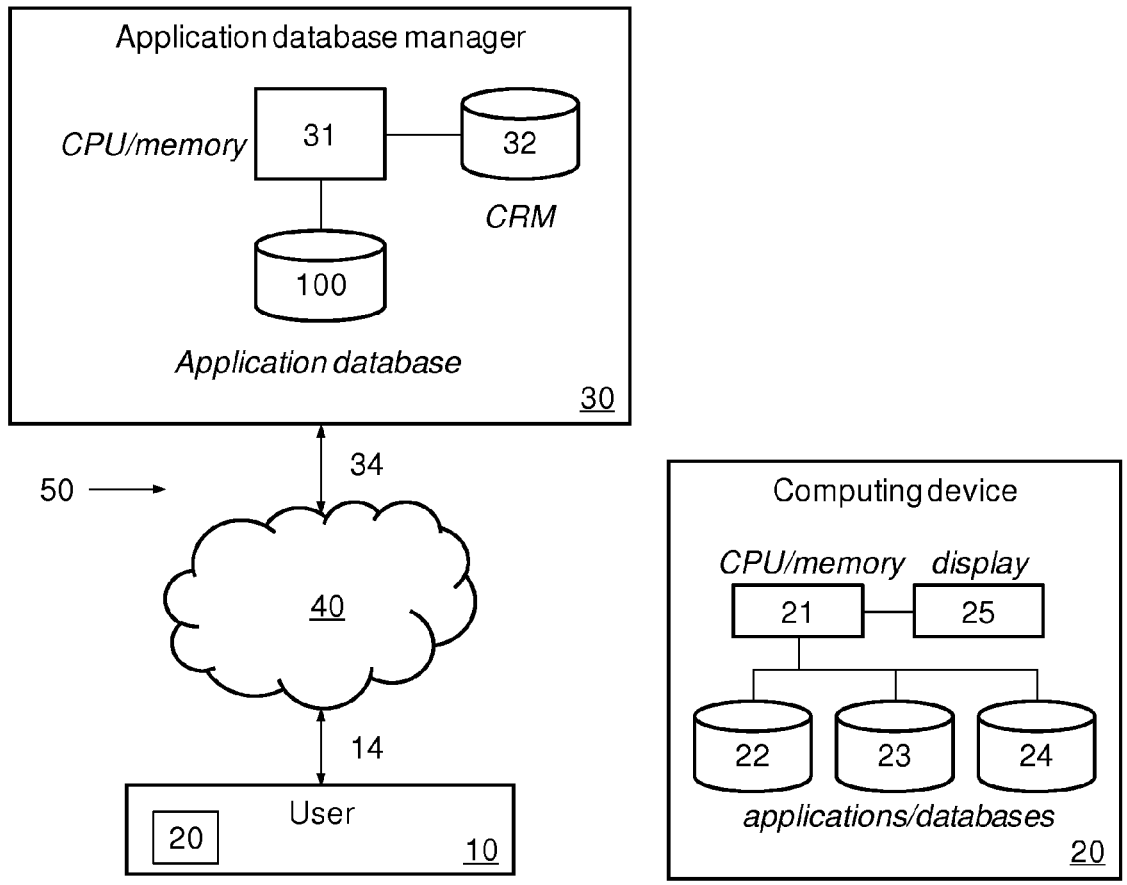
FIG. 4 is a diagram illustrating example systems and apparatus for use with and for performance of elements of the disclosed methods.

FIG. 4 shows a system 50 for generating contextual application recommendations according to the disclosure. In the system 50, at least one user 10 and an application database manager 30 (e.g., a software application content provider) interact with each other. The user 10 and the manager 30 may be remotely located relative to each other and may communicate electronically over a network or networks 40. The networks 40 may include a private network such as an intranet, a public network such as the internet, or a combination of multiple interconnected public and/or private networks. Connections 14 and 34 represent wired and/or wireless connections for the user 10 and the manager 30, respectively, to the networks 40, which connections 14 and 34 permit electronic communication/interaction between any parties in the system 50 (e.g., including multiple users). For example, connections 14 and 34 permit user-manager communication (e.g., submission/receipt of a user contextual web location information; transmission/receipt of at least one application recommendation derived from the contextual web location information).

The manager 30 includes at least one computer 31 (e.g., general purpose computer including a suitable processor coupled to memory, storage media, etc.) coupled to computer-readable media 32 (e.g., containing instructions for generating contextual application recommendations) and to at least one database for storing developer and application information (e.g., application database 100).

Figure 5:
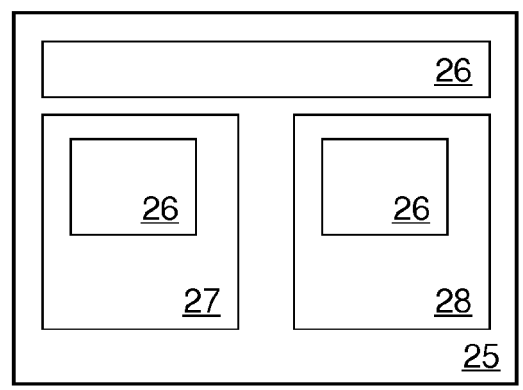
FIG. 5 is a diagram illustrating a computing device display providing application recommendations according to the disclosure.

The user 10 includes at least one computing device 20 to interface with the manager 30 and send/receive contextual web location information and recommendation information. The computing device 20 may be a personal computer, a laptop computer, a mobile computing device such as smartphone, tablet computer, music player, etc. The computing device 20 includes at least one processor/memory 21 (e.g., general purpose computer including a suitable processor coupled to memory, storage media, etc.) coupled to a computer display/monitor 25. The processor/memory 21 additionally is coupled to computer-readable media (e.g., including stored instructions for at least one local application, related databases, etc.) such as a recommendation application 22 (e.g., for generating an application recommendation as illustrated in FIGS. 1A, 1B, 2A, and 2B), a browser application 23 (e.g., for generating the local browsing history), and a content catalog application 24 (e.g., for downloading/installing recommended applications). As further illustrated in FIG. 5, the computing device display 25 presents an application recommendation notification 26 in a variety of environments: independent from other application environments, as a component of browser application window 27, and/or as a component of content catalog application window 28. In some cases, the computing device 20 corresponds to a hardware platform applicable to application(s) in the application database 100 and/or provided by the content manager 30 (e.g., such that a user may download and install queried applications to his/her computing device 20 after receiving the recommendations). In other cases, the computing device 20 need not correspond to a hardware platform applicable to application(s) in the application database 100 and/or provided by the content manager 30 (e.g., a general computer interface permitting a user receive application recommendations for a hardware platform other than that of the computing device 20).

In one aspect, the disclosure relates to the computer-readable media 32 with instructions for generating contextual application recommendations. The media 32 may include or be coupled to an application database 100 with corresponding application and developer records. The media 32 contains stored instructions which, when executed by the at least one computer 31 coupled to the media 32, cause the computer(s) 31 to perform application recommendation operations. For example, the computer(s) 31 may: provide an application database including a plurality of application records, each comprising a developer identifier and an application identifier; receive from a remote application contextual web location information including at least one of a remote developer identifier and a remote application identifier; determine if the contextual web location information corresponds to an application recommendation (e.g., by comparing the remote developer identifier to the application database developer identifier to generate a first application recommendation and/or comparing the remote application identifier to the application database application identifier to generate a second application recommendation); and if found, transmitting to a user of the remote application at least one of the first application recommendation and the second application recommendation.

In another aspect, the disclosure relates to the computer-readable media 22 with instructions for generating contextual application recommendations. The media 22 may include or be coupled to a computing device 20 with its corresponding processor/memory 21. The media 22 contains stored instructions which, when executed by the at least one computing device 20 coupled to the media 22, cause the computing device 20 to perform application recommendation operations. For example, the computing device 20 may: generate contextual web location information including at least one of a local developer identifier and a local application identifier by reading a location history obtained by navigating to a web location with a browser application on the computing device 20; querying an application database to determine if the contextual web location information corresponds to an application recommendation, where the application database includes a plurality of application records comprising a developer identifier and an application identifier, the application recommendation determination includes at least one of a first application recommendation corresponding to the local developer identifier, and a second application recommendation corresponding to the local application identifier; and if found, notifying a user of the computing device 20 of at least one of the first application recommendation and the second application recommendation.

In another aspect, the disclosure relates to a system 50 for generating a contextual application recommendation. In this aspect, the system 50 may include the at least one computer 31 (e.g., which is coupled to the computer-readable media 32) or at least computing device 20 (e.g., which is coupled to the computer-readable media 22) as described above. The specific computer(s)/computing device(s) 31, 20 usable in the system 50 are not particularly limited and may include, for example, digital computers, such as laptops, desktops, workstations, servers, blade servers, mainframes, mobile computing devices, and other appropriate computers.

EXAMPLE

The following prospective example illustrates the disclosed methods and systems, but is not intended to limit the scope of any claims thereto.

Example 1

A developer offers software applications "Application #1" and "Application #2" for download in an application catalog. Information regarding the applications is available from the developer's website at location "http://www.developer.com/application1" for Application #1 and at location "http://www.developer.com/application2" for Application #2. An application database managed by the application catalog content provider includes the following canonical URLs as developer identifiers: "developer.com/application1" (for the application identifier "Application #1") and "developer.com/application2" (for the application identifier "Application #2").

A user navigates to "http://www.developer.com" using a browser application on a computing device that is concurrently running a recommendation application according to the disclosure. A corresponding query on the canonical URL "developer.com" yields no application recommendation, as there are no matching developer identifiers in the application database.

The user then navigates to "http://www.developer.com/application1" using the browser application. Similar to above, a first query on the canonical URL "developer.com" corresponding to the user's web location yields no application recommendation. An iterative query process is used to generate a second query on the canonical URL "developer.com/application1" corresponding to the incremental addition of a web location path element to the canonical URL. The second query returns "Application #1" as the application recommendation based on the single matching developer identifier in the application database.

Throughout the specification, where the methods, processes, systems, or apparatus are described as including components or steps, it is contemplated that the methods, processes, systems, or apparatus may also comprise, consist essentially of, or consist of, any combination of the recited components or steps, unless described otherwise.

We claim:

1. A method for generating a contextual application recommendation, the method comprising:
   receiving from a remote application contextual web location information comprising at least one of a remote developer identifier and a remote application identifier;
   querying an application database to determine if the contextual web location information corresponds to an application recommendation, wherein:
      the application database comprises a plurality of pre-filtered application records comprising a developer identifier and an application identifier, wherein the pre-filtered application records include applications meeting a threshold level of quality; and
      the application database query comprises at least one of:
         comparing the remote developer identifier to the application database developer identifier to generate a first application recommendation, and
         comparing the remote application identifier to the application database application identifier to generate a second application recommendation; and
   if found, transmitting to a user of the remote application at least one of the first application recommendation and the second application recommendation.

2. The method of claim 1, wherein:
   the contextual web location information comprises the remote developer identifier;
   the application database developer identifier comprises a developer uniform resource locator (URL) address; and
   the remote developer identifier comprises a remote URL address.

3. The method of claim 1, wherein the contextual web location information comprises the remote application identifier.

4. The method of claim 1, further comprising:
   transmitting to the user at least one of the first application and the second application.

5. A method for generating a contextual application recommendation, the method comprising:
   generating contextual web location information comprising at least one of a local developer identifier and a local application identifier from a web browser application navigation location history;
   querying an application database to determine if the contextual web location information corresponds to an application recommendation, wherein:
      the application database comprises a plurality of pre-filtered application records comprising a developer identifier and an application identifier, wherein the pre-filtered application records include applications meeting a threshold level of quality; and
      the application recommendation determination comprises at least one of: a first application recommendation corresponding to the local developer identifier, and a second application recommendation corresponding to the local application identifier; and
   if found, notifying a user of the browser application of at least one of the first application recommendation and the second application recommendation.

6. The method of claim 5, wherein querying the application database comprises:
   transmitting the contextual web location information to a remote application database manager maintaining the application database; and
   if the contextual web location information corresponds to an application recommendation, receiving at least one of the first application recommendation and the second application recommendation from the remote application database manager.

7. The method of claim 5, wherein:
   the contextual web location information comprises the local developer identifier;
   the application database developer identifier comprises a developer uniform resource locator (URL) address; and
   the local developer identifier comprises a local URL address.

8. The method of claim 5, wherein the contextual web location information comprises the local application identifier accessed from the web location.

9. The method of claim 5, further comprising:
   installing at least one of the first application and the second application on a local computing device.

10. The method of claim 5, wherein notifying the user comprises: providing the notification while the browser application is directed to the web location generating the contextual web location information.

11. The method of claim 5, wherein notifying the user comprises: providing the notification while the browser application is not directed to the web location generating the contextual web location information.

12. The method of claim 5, wherein notifying the user comprises: providing the notification in an environment external to the browser application.

13. A computer readable storage medium comprising:
   an encoded computer program, the program comprising instructions that, when executed by a processor, cause the processor to:
   read a local web browser application navigation location history;
   generate contextual web location information comprising at least one of a local developer identifier and a local application identifier from the location history;
   query an application database to determine if the contextual web location information corresponds to an application recommendation, comprising at least one of a first application recommendation corresponding to the local developer identifier, and a second application recommendation corresponding to the local application identifier; and
   if found, notify a user of the browser application of at least one of the first application recommendation and the second application recommendation.

14. The computer readable storage medium of claim 13, wherein the encoded computer program further comprises instructions that, when executed by a processor, cause the processor to:
- transmit the contextual web location information to a remote application database manager maintaining the application database to query the application database; and
- if the contextual web location information corresponds to an application recommendation, receive at least one of the first application recommendation and the second application recommendation from the remote application database manager.

15. The computer readable storage medium of claim 13, wherein:
- the contextual web location information comprises the local developer identifier;
- the application database developer identifier comprises a developer uniform resource locator (URL) address; and
- the local developer identifier comprises a local URL address.

* * * * *